E. W. VERY.
Signal Cartridge.
No. 8,167. Reissued April 9, 1878.
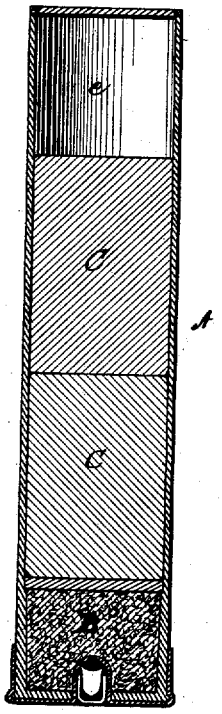
WITNESSES:
C. Clarence Poole
Geo. H. Evans
INVENTOR:
Edward W. Very
per atty A. H. Evans & Co.
N. PETERS, PHOTO-LITHOGRAPHER, WASHINGTON, D. C.

UNITED STATES PATENT OFFICE.

EDWARD W. VERY, OF ANNAPOLIS, MARYLAND.

IMPROVEMENT IN SIGNAL-CARTRIDGES.

Specification forming part of Letters Patent No. 190,263, dated May 1, 1877; Reissue No. 8,167, dated April 9, 1878; application filed September 4, 1877.

*To all whom it may concern:*

Be it known that I, EDWARD W. VERY, of Annapolis, Maryland, have invented a new and useful Improvement in Pyrotechnic Signal-Cartridges, of which the following is a clear, full, and exact description, reference being had to the accompanying drawings, making a part of this specification, in which the figure shows a signal case or cartridge loaded and ready for firing.

My invention relates to pyrotechnic signals to be thrown into the air by means of the explosive force of a charge of common gunpowder; and it consists of a percussion-capped signal cartridge or shell, having a charge of powder, and being provided with one or more signal-balls, directly ignited by the flame of the burning gunpowder, and showing their light from the time they leave the cartridge-case and pistol until they are entirely consumed.

To enable others skilled in the art to make and use my invention, I will proceed to describe the exact manner in which I have carried it out.

In the drawing, A represents a common cartridge-case, capped and provided with the charge of powder, B. Upon this powder I place an ordinary wad, and upon the wad is placed one or more lumps of signal-composition, C C, made of the required shape and density, and of such materials as will cause it to burn with a flame of any desired color. Above this charge an air-space, C, is left, and the mouth of the case is covered with a light and suitable wad or cover to secure the signal from damage or deterioration.

The signal can be thrown to a height of three hundred feet by means of a pistol constructed for the purpose.

In my system of signals I use but two colors, usually, red and green; other colors may, however, be used without departing from the spirit of my invention. The balls, representing a digit of any numbered code or letter of a lettered code, are thrown either simultaneously or in quick succession, so that they are all seen at once. The time of burning is five or more seconds, and the balls have a brilliancy sufficient to be distinguished at least three miles, they being directly ignited by the flames of the gunpowder, and showing their light from the time they leave the cartridge-case and pistol until they are entirely consumed. By this system the operator has complete control of the ignition, which is instantaneous. The signal is made at such a height as to clear all ordinary obstructions to vision. The signal-cases may be loaded or unloaded, at the will of the operator, in order to make any desired change in color or force of discharge.

Signals may be examined thoroughly, taken apart and surveyed, and if found good the same parts may be returned to place without loss, change, or damage to the signal. The observer sees the whole combination forming a digit or letter at once. The arrangement of colors, groups, and combinations is entirely at the will of the operator.

Having thus described my invention, what I claim as new, and desire to secure by Letters Patent, is—

1. A percussion-capped signal cartridge or shell, having a charge of gunpowder, and being provided with one or more signal-balls, directly ignited by the flame of the burning gunpowder, and showing their light from the time they leave the cartridge-case and pistol until they are entirely consumed, substantially as and for the purpose set forth.

2. The pyrotechnic signal herein described, consisting of a combustible material formed into signal masses or stars, capable of emitting colored masses of light when propelled by an explosive charge of gunpowder, in connection with a primed and charged cartridge-shell, adapted for use in an ordinary fire-arm, as and for the purpose set forth.

EDWARD W. VERY.

Witnesses:
GEO. H. EVANS,
A. H. EVANS.